United States Patent
Saito (10) Patent No.: US 7,520,986 B2
(45) Date of Patent: Apr. 21, 2009

(54) FILTRATION DEVICE

(75) Inventor: Yasuhiro Saito, Kanagawa (JP)

(73) Assignee: Nihon Genryo Co., Ltd., Kawasaki-shi (JP)

( * ) Notice: Subject to any disclaimer, the term of this patent is extended or adjusted under 35 U.S.C. 154(b) by 420 days.

(21) Appl. No.: 10/595,545

(22) PCT Filed: Oct. 26, 2004

(86) PCT No.: PCT/JP2004/016201

§ 371 (c)(1),
(2), (4) Date: Apr. 27, 2006

(87) PCT Pub. No.: WO2005/039733

PCT Pub. Date: May 6, 2005

(65) Prior Publication Data

US 2007/0125694 A1      Jun. 7, 2007

(30) Foreign Application Priority Data

Oct. 28, 2003   (JP)   ............................ 2003-366873

(51) Int. Cl.
*B01D 24/46* (2006.01)
(52) U.S. Cl. .................... 210/270; 210/276; 210/502.1
(58) Field of Classification Search .............. 210/270, 210/278, 769, 502.1, 276; 198/672
See application file for complete search history.

(56) References Cited

U.S. PATENT DOCUMENTS 564,305 A * 7/1896 Davis ......................... 210/206

FOREIGN PATENT DOCUMENTS

| EP | 1527805 A | 11/2006 |
|---|---|---|
| GB | 2380952 A | 4/2003 |
| JP | 58-186409 Y | 10/1983 |
| JP | 61204149 A | 9/1986 |
| JP | 63 1988 98704 | 6/1988 |
| JP | 10-0128732 Y | 5/1998 |
| JP | 10128732 A | 5/1998 |
| WO | WO03/043715 Y | 5/2003 |

* cited by examiner

*Primary Examiner*—Matthew O Savage
(74) *Attorney, Agent, or Firm*—Lucas & Mercanti, LLP

(57) ABSTRACT

A filtration device is equipped with: a filtration tank; a layer of particulate filtration media within the filtration tank; a cleansing tank, which is vertically placed within the filtration tank and which has an opening at the lower end thereof; and a screw conveyor for cleansing the filtration media, which is provided within the cleansing tank. The screw conveyor has a shaft, which is suspended within the filtration tank from above. The upper portion of the shaft is driven, and the lower portion of the shaft is supported by an axial support section, which is fixed to the lower portion of the cleansing tank. The axial support section is equipped with a frictional wear compensating mechanism at a portion thereof at which the shaft and the axial support section contact each other.

18 Claims, 6 Drawing Sheets

FILTRATION DEVICE

BACKGROUND OF THE INVENTION

1. Field of the Invention

The present invention relates to a filtration device that utilizes filtration media, such as activated carbon, to filter liquids, such as water. Particularly, the present invention relates to a filtration device that rotates a built in screw conveyor to cleanse the filtration media, in order to recover adsorption functions and filtration functions of the filtration media.

2. Description of the Related Art

If filtration devices are utilized for long periods of time, filtration media (filtration sand, activated carbon, and the like) within filtration tanks of the filtration devices become clogged. This prevents the performance of efficient filtration, and deteriorates the quality of filtered liquids, such as water. For this reason, clogging is eliminated by removing contaminants, which are attached to the filtration media. In order to perform operations efficiently, it is desirable that the process of removing the contaminants from the filtration media, that is, a cleansing process, be performed in a short amount of time with few steps. It is also desirable that the cleansing process be performed without taking up additional space. For these reasons, filtration sand cleansing devices (filtration media cleansing mechanisms) provided within filtration tanks have been considered. The provision of cleansing mechanisms within filtration tanks would enable efficient cleansing of filtration media in a short amount of time, without removing the filtration media from within the filtration tanks.

There are known filtration devices, as disclosed, for example, in Japanese Unexamined Utility Model Publication No. 63(1988)-98704, which have been developed in view of these points.

The filtration device disclosed in Japanese Unexamined Utility model Publication No. 63-98704 comprises an elevating pipe (cleansing tank) erected therein, and a spiral water elevator provided within the elevating pipe. During filtration, water is discharged by a water dispersing tube, which is within filtration sand. Processed water (filtered water), which has been filtered by passing through the filtration sand from below, is discharged above the filtration sand. During cleansing of the filtration sand, the spiral water elevator rotates and elevates the filtration sand, which has trapped contaminants, from the lower portion of the spiral water elevator. The contaminants are separated from the filtration sand by use of centrifugal force. The filtration sand is expelled through a filtration sand expulsion opening, which is provided in the upper portion of the elevating pipe. The filtration sand then returns to the interior of the filtration tank. The spiral water elevator is driven at its upper portion, and the lower end thereof is supported by a bearing.

In this conventional filtration device, the spiral water elevator is axially supported by the shaft of the spiral elevator being inserted into an aperture provided in the lower end of the tank. Therefore, if the portions of the shaft and the aperture that contact each other become worn, the shaft becomes loose in the aperture. As a result, there is a possibility that problems, such as smooth rotation of the spiral water elevator being prevented and water leaking, may occur.

If the spiral water elevator is supported at both the upper and lower ends thereof, rotational fluctuations and vibrations become less likely to occur. However, in an environment surrounded by filtration media, wear of the bearing cannot be prevented. In the case that the bearing becomes worn, there is a problem that the bearing cannot be easily repaired or replaced. In addition, filtration operations must be ceased during the repair or replacement.

The present invention has been developed in view of the foregoing points. It is an object of the present invention to provide a filtration device that automatically compensates for frictional wear of an axial support section of a screw conveyor when the axial support section becomes worn, without repairing or replacing worn parts, thereby maintaining stable performance over a long period of time.

DISCLOSURE OF THE INVENTION

The filtration device of the present invention comprises:
a filtration tank, having a filter bed for supporting a layer of particulate filtration media;
a vertically oriented hollow cleansing tank having an opening at the lower end thereof, provided in the filtration tank;
a screw conveyor, for conveying the filtration media upwards within the cleansing tank while cleansing the filtration media; and
a contaminant expulsion means, for expelling contaminants separated from the filtration media during cleansing to the exterior of the filtration tank; wherein:
the screw conveyor has a shaft, which is suspended within the filtration tank from above;
the upper portion of the shaft is driven, and the lower portion of the shaft is supported by an axial support section, which is fixed to the lower portion of the cleansing tank; and
a frictional wear compensating mechanism is provided at a portion of the axial support section where the shaft and the axial support section contact each other.

A configuration may be adopted, wherein:
a recess is provided in the lower end of the shaft of the screw conveyor;
a protrusion for engaging with the recess is provided on the axial support section; and
the frictional wear compensating mechanism is constituted such that the protrusion is constantly urged toward the screw conveyor by a spring.

A configuration may be adopted, wherein:
the upper tip of the protrusion is conical in shape;
the recess is formed to be substantially complementary with the conical shape of the protrusion; and
a cutout is provided in the tip of the protrusion, or a further recess is provided in the center of the recess.

A configuration may be adopted, wherein:
the cleansing tank is suspended within the filtration tank from above; and
the axial support section is mounted to the lower end of the cleansing tank.

A configuration may be adopted, wherein the axial support section comprises:
a ring, which is mounted about the periphery of the lower end of the cleansing tank;
a spring for urging the protrusion;
a central portion for holding the spring and the protrusion;
and a plurality of link rods for linking the central portion and the ring.

The filtration media may be activated carbon.

The filtration device of the present invention comprises: the filtration tank that has the layer of particulate filtration media therein; the vertically oriented hollow cleansing tank having the opening at the lower end thereof, provided in the filtration tank; the screw conveyor, for conveying the filtration media upwards within the cleansing tank while cleansing the filtration media; and the contaminant expulsion means, for expelling contaminants separated from the filtration media during cleansing to the exterior of the filtration tank. The screw conveyor comprises the shaft, which is suspended within the filtration tank from above, the upper portion of which is driven, and the lower portion of which is supported by an axial support section, fixed to the lower portion of the cleansing tank. The frictional wear compensating mechanism is provided at the portion of the axial support section where the shaft and the axial support section contact each other. Therefore, the filtration device of the present invention exhibits the following advantageous effects.

Even if the axial support section for the screw conveyor becomes worn, the frictional wear is automatically compensated. Therefore, looseness between the shaft and the axial support section is prevented, and stable performance can be maintained over a long period of time, without repairing or replacing worn parts.

A configuration may be adopted, wherein: a recess is provided in the lower end of the shaft of the screw conveyor; a protrusion for engaging with the recess is provided on the axial support section; and the frictional wear compensating mechanism is constituted such that the protrusion is constantly urged toward the screw conveyor by a spring. In this case, even if the protrusion becomes worn, because it is constantly being urged toward the recess, a suitable axial support state can be maintained even if frictional wear progresses.

A configuration may be adopted, wherein: the upper tip of the protrusion is conical in shape; the recess is formed to be substantially complementary with the conical shape of the protrusion; and a cutout is provided in the tip of the protrusion, or a further recess is provided in the center of the recess. In this case, even if the tip of the protrusion becomes worn, the complementary recess provides suitable axial support, while maintaining the axial center of the screw conveyor at its predetermined position. Accordingly, there is no possibility that vibrations and rotational fluctuations will occur.

A configuration may be adopted, wherein: the cleansing tank is suspended within the filtration tank from above; and the axial support section is mounted to the lower end of the cleansing tank. In this case, the cleansing tank and the screw conveyor can be integrated as a unit, which facilitates building and repair of the filtration device.

A configuration may be adopted, wherein the axial support section comprises: a ring, which is mounted about the periphery of the lower end of the cleansing tank; a spring for urging the protrusion; a central portion for holding the spring and the protrusion; and a plurality of link rods for linking the central portion and the ring. In this case, a sufficient size for drawing the filtration media into the cleansing tank can be secured at the lower end thereof. In addition, the ring prevents deformation of the cleansing tank due to pressure exerted by the filtration media, and also serves to maintain a coaxial relationship between the cleansing tank and the shaft of the screw conveyor. Accordingly, gaps between the screw conveyor and the inner surface of the cleansing tank are maintained at a constant distance, even if the screw conveyor and the cleansing tank are long. Therefore, contact between the screw conveyor and the cleansing tank during rotation of the screw conveyor can be prevented.

The filtration media may be activated carbon. In this case, organic materials and chlorine can be adsorbed by the filtration media. In addition, the layer of filtration media can be formed to be think, which enables suitable filtration, and the full functions of activated carbon can be utilized.

BRIEF DESCRIPTION OF THE DRAWINGS

FIGS. 6A, 6B, and 6C illustrate members which are mounted on the axial support block of FIG. 4, wherein.

BEST MODE FOR CARRYING OUT THE INVENTION

Figure 1:
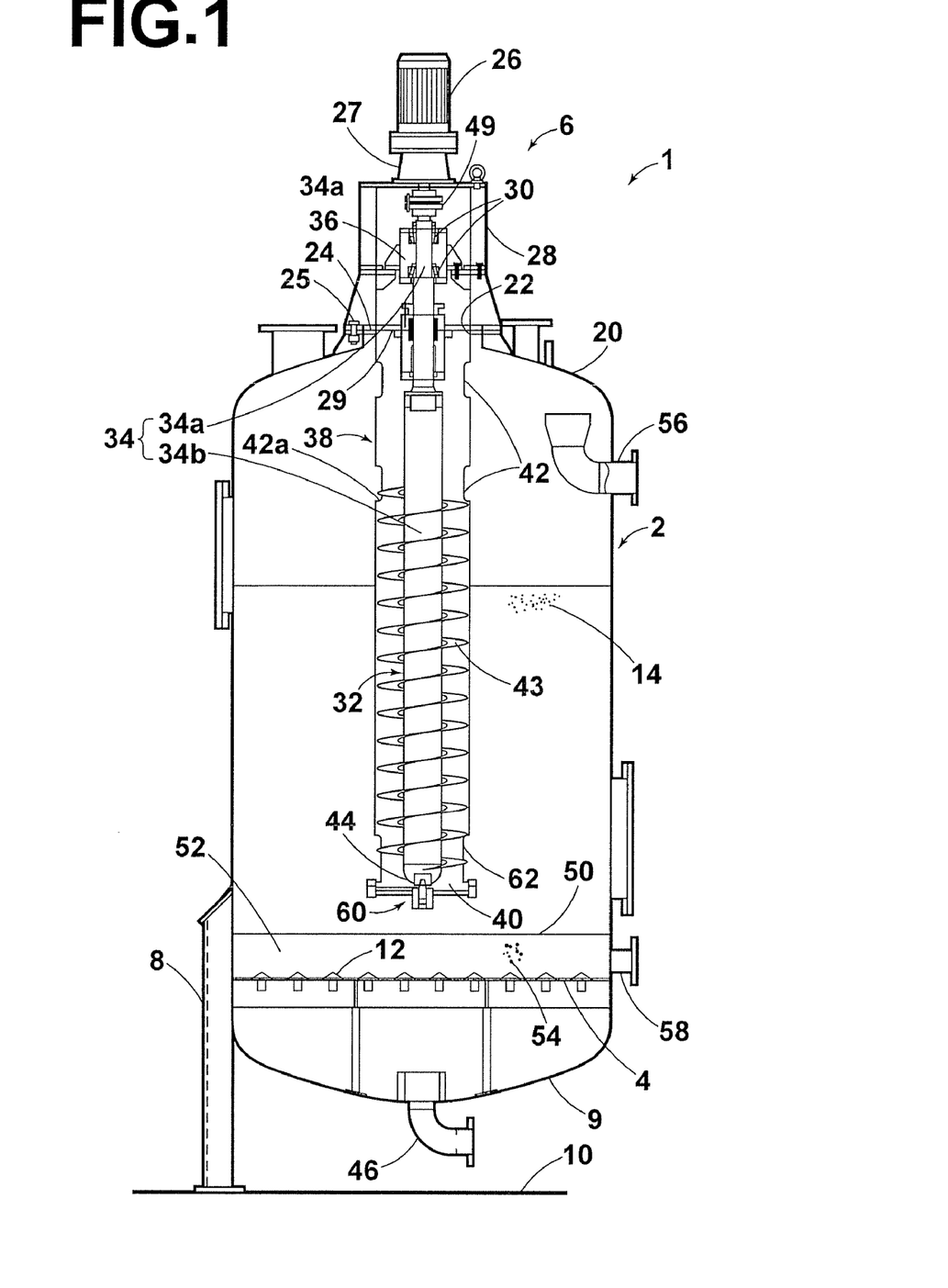
FIG. 1 is a vertical sectional view that illustrates an embodiment of the filtration device according to the present invention.

Hereinafter, preferred embodiments of the filtration device according to the present invention will be described in detail with reference to the attached drawings. FIG. 1 is a vertical sectional view that illustrates a filtration device 1 according to a first embodiment of the present invention. First, the general construction of the filtration device 1 will be described with reference to FIG. 1.

As illustrated in FIG. 1, the filtration device 1 according to the first embodiment of the present invention comprises: a filtration tank 2, which is substantially cylindrical with a sealed top and bottom; a horizontally arranged wire mesh (filter bed) 50 and a horizontally arranged filtration plate (filter bed), which are provided vertically spaced apart from each other in the lower portion of the interior of the filtration tank 2; and a filtration media cleansing mechanism 6 (hereinafter, simply referred to as "cleansing mechanism"), which is mounted on a curved upper wall 20 of the filtration tank 2. The cleansing mechanism 6 comprises a motor 26, a brake mechanism 27, a base 28, a cleansing tank 38, and a screw conveyor 32, to be described later. The cleansing mechanism 6 further comprises a filtered water discharge pipe 46, which serves as a contaminant expulsion means, and a raw water supply pipe 56.

Four support legs 8 (only one is illustrated in FIG. 1) are mounted on the filtration tank 2. The support legs 8 set the filtration tank 2 on a floor 10. The filter bed 4 is provided at a distance from a curved bottom wall 9 of the filtration tank 2. A plurality of strainers 12, for collecting and passing filtered liquid (filtered water) downward, are provided in the filter bed 4 (refer to FIG. 1).

A layer of activated carbon 14 (filtration media), for filtering the raw water supplied by the raw water supply pipe 56, is provided on the wire mesh 50. The wire mesh 50 has a mesh size smaller than the particles of the activated carbon 14, in order to prevent the activated carbon 14 from dropping downward therethrough. Specifically, the activated carbon 14 has particle diameters of approximately 10 mesh to 32 mesh. Note that particle diameters expressed in units of mesh represents the number by which 25.4 mm is divided. That is, 10 mesh represents a particle diameter which is 25.4 mm divided by 10, and 32 mesh represents a particle diameter which is 25.4 mm divided by 32.

A layer of gravel having greater diameters than the activated carbon 14, that is, a layer of gravel 54 (support layer) is provided within a space 52 between the mesh 50 and the filter bed 4. The gravel 54 is utilized as a support member for supporting the activated carbon 14. The entirety of the layer of gravel 54 is covered by the wire mesh 50, and is incapable of moving toward the layer of activated carbon 14. Therefore, unevenness is not generated therein, the flow of water is dispersed, and uniform filtration is possible. In the case of the present embodiment, the height and diameter of the filtration tank 2 are approximately 3 meters and 1.6 meters, respectively, and the height of the space 52 is approximately 19 cm.

The height of the filtration tank 2 of the present invention is comparatively great for the following reasons. The activated carbon 14, which is utilized as the filtration media, removes chlorine and organic materials by adsorption. Therefore, it is necessary for the water (liquid) to be processed and the activated carbon 14 to have a sufficient amount of time to be in contact with each other. In addition, space efficient filtration devices that do not require as much installation space as an activated carbon adsorption device (filtration device), which generally has a large cross sectional area, are desired. Therefore, the cross sectional area of the filtration tank 2 is reduced, thereby decreasing the area of a floor 10 occupied by the filtration device 1, and the activated carbon layer is made thicker, in order to increase the amount of time that the water and the activated carbon 14 are in contact with each other. Further, the flow speed of the water is reduced, to increase the amount of time that the water and the activated carbon 14 are in contact with each other.

Generally, if the layer of filtration media is comparatively thin, a screw conveyor may also be short. Therefore, vibrations and rotational fluctuations are not likely to occur in such a short screw conveyor, even if the screw conveyor is supported only at the upper portion thereof, which is driven. However, if activated carbon is utilized as the filtration media and the layer of filtration media is caused to be thicker due to the reasons stated above, it becomes necessary to lengthen the screw conveyor accordingly. As a result, axial fluctuations become more likely to occur during rotation of the screw conveyor, and the possibility of problems, such as the screw conveyor coming into contact with an inner cylinder, that is, the cleansing tank, increases. For this reason, in the present invention, a configuration is adopted wherein the lower end 44 of the long screw conveyor 32 is axially supported. The configuration of the axial support structure will be described later.

A circular mounting opening 22 is formed in the central portion of the upper wall 20 of the filtration tank 2. The cleansing mechanism 6 is mounted to the mounting opening 22 by bolts (not shown). The peripheral edge of the mounting opening 22 is formed into a mounting rim 24. The base 28, on which the motor 26 and the brake mechanism 27 is provided, is mounted on the rim 24 (refer to FIG. 1). A holding portion 36, comprising a plurality of bearings 30, is formed in the base 28. A shaft 34 of the screw conveyor 32 (cleansing means) is supported by the bearings 30 so as to be rotatable without axial displacement. Note that the motor 26 and the brake mechanism 27 are collectively referred to as a drive portion.

Next, the cleansing mechanism 6 will be described in detail. The cylindrical cleansing tank 38 of the cleansing mechanism 6 has a discoid mounting wall 29 at the upper portion thereof. The mounting wall is mounted onto the rim 24 along with the base 28 by bolts (not shown). In the drawings, the bolts will be indicated by central lines that indicate their positions. When the upper portion of the cleansing tank 38 is mounted onto the rim 24 in this manner, substantially the entirety of the cleansing tank 38 becomes suspended from the upper portion of the filtration tank 2.

As illustrated in FIG. 1, the lower portion of the cleansing tank 38 is an open circular lower opening 40. A plurality of openings 62 that open toward the sides are also formed at the lower portion of the cleansing tank 38. In addition, a plurality of vertically extending upper openings 42 are formed at predetermined intervals along the outer periphery of the upper portion of the cleansing tank 38. The positional relationship between the lower opening 40 and the activated carbon 14 is determined such that the lower opening 40 is positioned within the activated carbon 14. The screw conveyor 32 is provided in the interior of the cleansing tank 38. The shaft 34 of the screw conveyor 32 is constituted by a small diameter portion 34a, having a relatively small diameter, and a large diameter portion 34b, having a relatively large diameter.

The shaft 34 is linked to the motor 26 via a coupling 49. The large diameter portion 34b, provided to impart strength to the shaft 34, is formed as a hollow pipe, with a sealed lower end 44. The lower end 44 of the shaft 34 is formed as a spherical surface. Because the lower end 44 is formed as a spherical surface, vortices are prevented from being generated during rotation of the screw conveyor 32 to perform cleansing. Thereby, unnecessary agitation of activated carbon 14 that contact the lower end 44 can be prevented. The shape of the lower end 44 will be described in detail later. A spiral screw blade 43 is formed on the large diameter portion 34b of the shaft 34. The blade 43 is formed so that it extends to the vicinity of the lower end 44 of the shaft 34. Note that the blade 43 is mounted to the shaft 34 in a state such that it is spaced therefrom, via a plurality of stays. The blade 43 is provided such that a slight gap exists between the outer edge thereof and the inner peripheral surface of the cleansing tank 38.

When the blade 43 of the screw conveyor 32 is arranged within the cleansing tank 38 in this manner, the upper end of the blade 43 is positioned in the vicinity of lower edges 42a of the upper openings 42, as illustrated in FIG. 1. At this time, the lower end 44 of the screw conveyor 32 is position in the vicinity of the lower opening 40 of the cleansing tank 38. The lower end 44 of the screw conveyor 32 is rotatably supported by an axial support section 60, which is mounted on the lower end of the cleansing tank 38. The configuration of the axial support section 60 will be described later.

Next, the components of the filtration device 1, which are attached to the exterior of the filtration tank 2, will be described. The downwardly extending filtered water discharge pipe 46 is mounted at the center of the curved bottom wall 9 of the filtration tank 2. Liquid, which has passed through the activated carbon 14, the wire mesh 50, the gravel 54, and the strainers 12, and which has been filtered thereby, is discharged through the filtered water discharge pipe 46. Slots (not shown), which are smaller than the gravel 54, are formed in the strainers 12. Four cleansing water spraying pipes 58 (liquid spraying portions) are mounted on the exterior wall of the filtration tank 2 at positions corresponding to the space 52. The cleansing water spraying pipes 58 are angled and mounted at equidistant intervals along the outer periphery of the filtration tank 2. The function of the cleansing water spraying pipes 58 will be described later.

Figure 2:
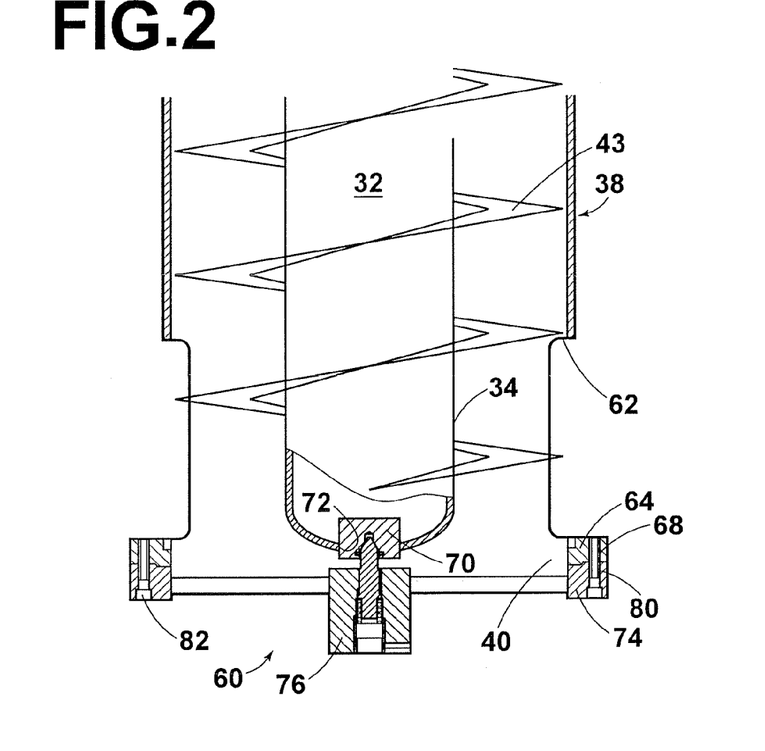
FIG. 2 is a partial magnified view of the periphery of an axial support section of the filtration device of FIG. 1.
Figure 3:
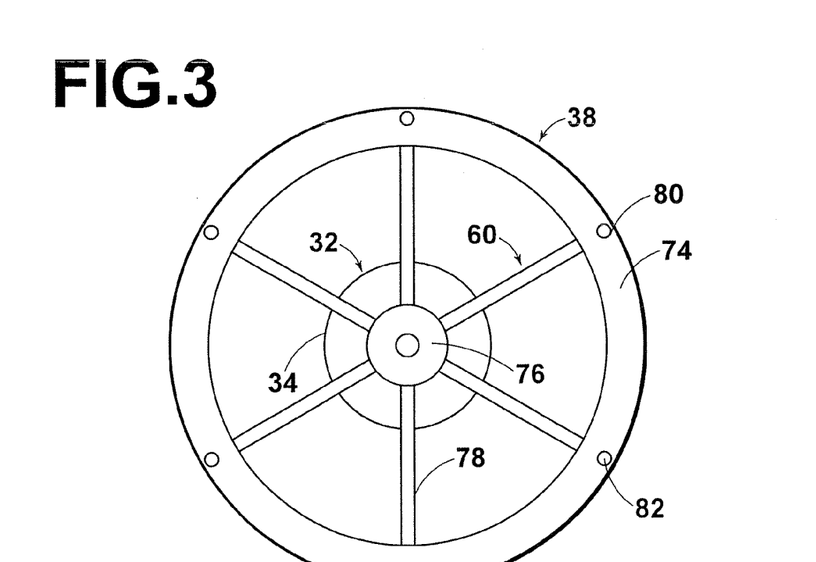
FIG. 3 is a magnified bottom view of a cleansing tank, from which a blade of a screw conveyor has been omitted.

The axial support section 60, which is the characteristic feature of the present invention, will be described with reference to FIG. 2 and FIG. 3. FIG. 2 is a partial magnified view of the periphery of the axial support section 60 of the filtration device 1. FIG. 3 is a magnified bottom view of the cleansing tank 38. Note that the blade 43 has been omitted from FIG. 3. Four openings 62 (two are visible in FIG. 2) are formed in the side of the cleansing tank 38 at the lower portion thereof. A discoid flange 64 is formed along the circumference of the cylindrical cleansing tank 38 at the lower edge thereof. The inner portion of the flange 64 is the circular opening 40, which communicates with the interior of the cleansing tank 38. Six downwardly facing threaded apertures 68 are formed in the flange 64 at equidistant intervals.

An aperture 72 is formed in the lower end of the shaft 34 of the screw conveyor 32, and a cylindrical block 70 is welded into the aperture 72. The details of the block 70 will be described later. The axial support section 60, which is mounted on the flange 64 comprises: a ring 74; an axial support block 76 (central portion), for supporting the shaft 34 of the screw conveyor 32; and six equidistantly spaced link rods 78 that link the axial support block 76 and the ring 74. The link rods 78 are circular in cross section. The ring 74, the axial support block 76 and the link rods 78 are formed of metal, for example, stainless steel.

The link rods 78 are welded to the ring 74 and the axial support block 76. The ring 74 has a diameter corresponding to that of the flange 64, and has six threaded apertures 80 that correspond to the threaded apertures 68 of the flange 64. The axial support section 60 is mounted to the lower end of the cleansing tank 38 by screws 82 being threaded into the threaded apertures 68 and 80.

Figure 4:
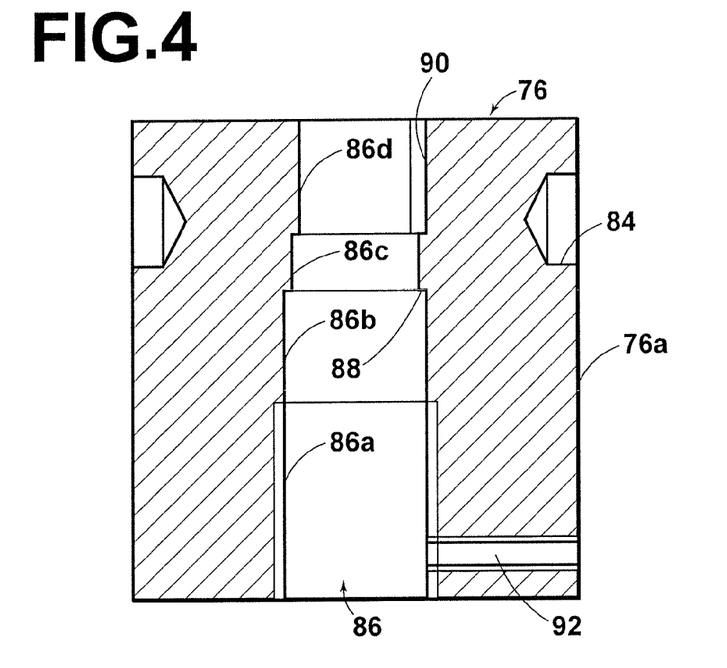
FIG. 4 is a magnified vertical sectional view of an axial support block, which is utilized in the filtration device of the present invention.
Figure 5:
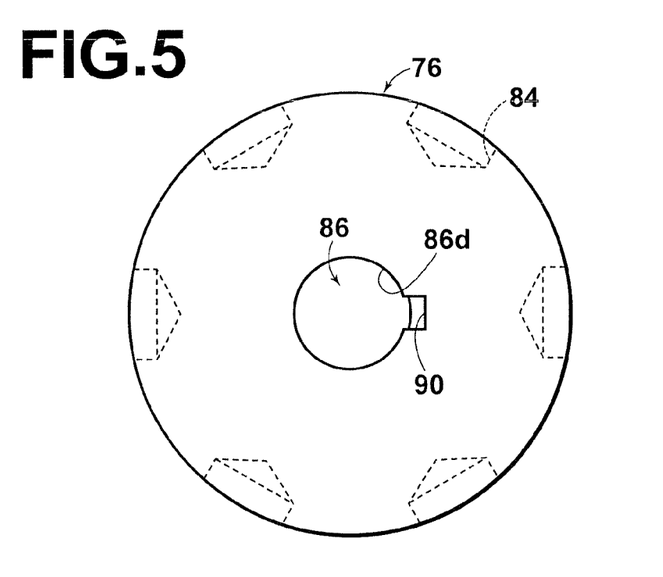
FIG. 5 is a magnified plan view of the axial support block of FIG. 4.
Figure 6A:
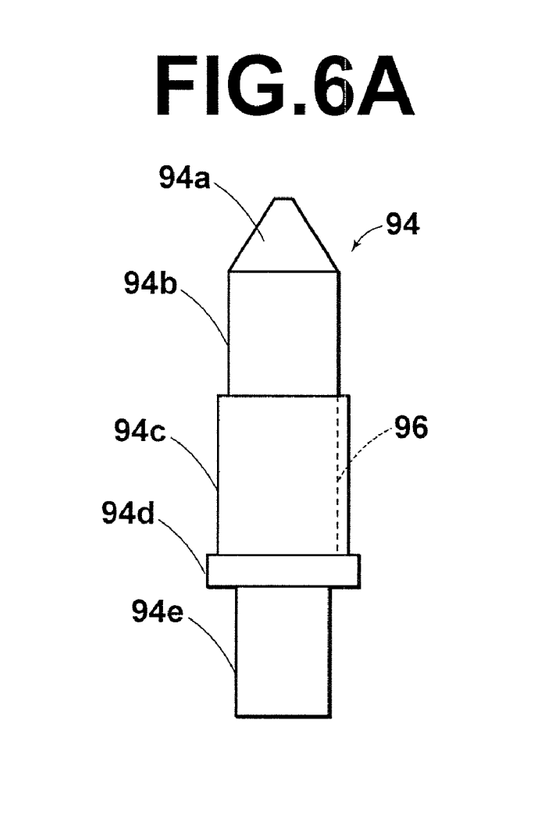
FIG. 6A is a magnified front view of a core pressing pin.
Figure 6B:
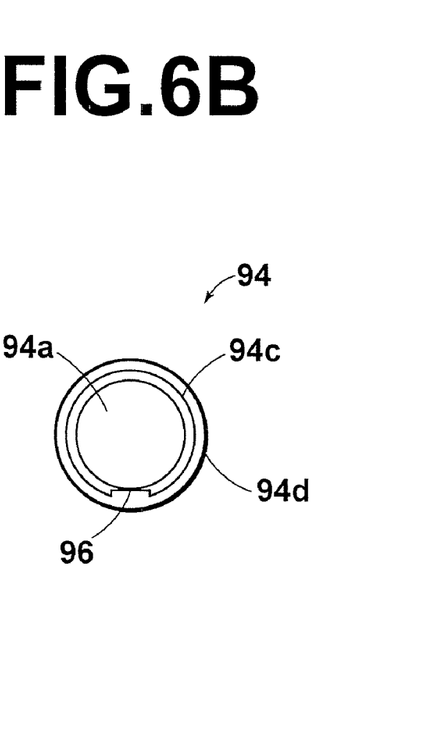
FIG. 6B is a magnified plan view of the core pressing pin.
Figure 6C:
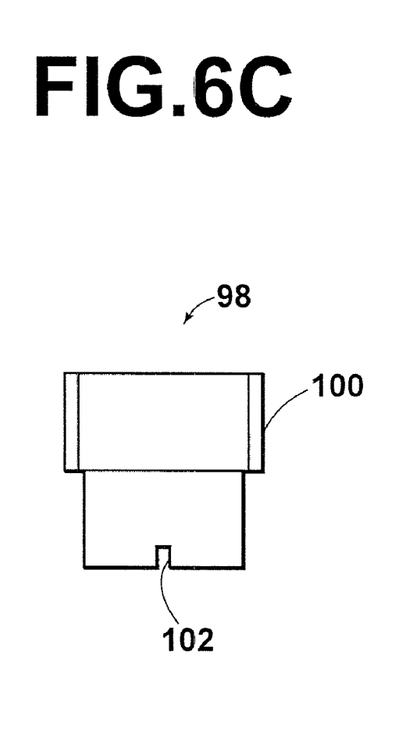
FIG. 6C is a magnified front view of a spring holding member.

Next, the axial support section 60 will be described in further detail with reference to FIGS. 4 through 6C. FIG. 4 is a magnified vertical sectional view of the axial support block 76. FIG. 5 is a magnified plan view of the axial support block 76. FIGS. 6A, 6B, and 6C illustrate members which are mounted on the axial support block 76, wherein: FIG. 6A is a magnified front view of a core pressing pin 94; FIG. 6B is a magnified plan view of the core pressing pin 94; and FIG. 6C is a magnified front view of a spring holding member 98.

"First, a description will be given with reference to FIGS. 4 and 5. The axial support block 76 is cylindrical in shape, and six circular holes 84 are formed about the periphery thereof. The link rods 78 are inserted into the holes 84 and welded, to fix the axial support block 76 to the link rods 78. An aperture 86 that penetrates the axial support block 76 in the vertical direction is formed such that it is concentric with the axial center of the cylindrical axial support block 76. The aperture 86 is sectioned into a plurality of regions. From the lower end to the upper end of the aperture 86, the regions are as follows: a large diameter threaded section 86*a*; an intermediate aperture 86*b*, having substantially the same inner diameter as the threaded section 86*a*; a passage aperture 86*c* having a smaller diameter than the intermediate aperture 86*b*; and an upper aperture 86*d* having a smaller diameter than the passage aperture 86*c*."

A downwardly facing annular step 88 is formed at the boundary between the intermediate aperture 86*b* and the passage aperture 86*c*. A keying groove 90 that extends in the longitudinal direction of the aperture 86 is formed in the upper aperture 86*d*. All of the regions are formed concentric with the axial center of the aperture 86. A threaded aperture 92, which is perpendicular to the threaded section 86*a*, is formed in the lower side surface of the axial support block 76.

Figure 7:
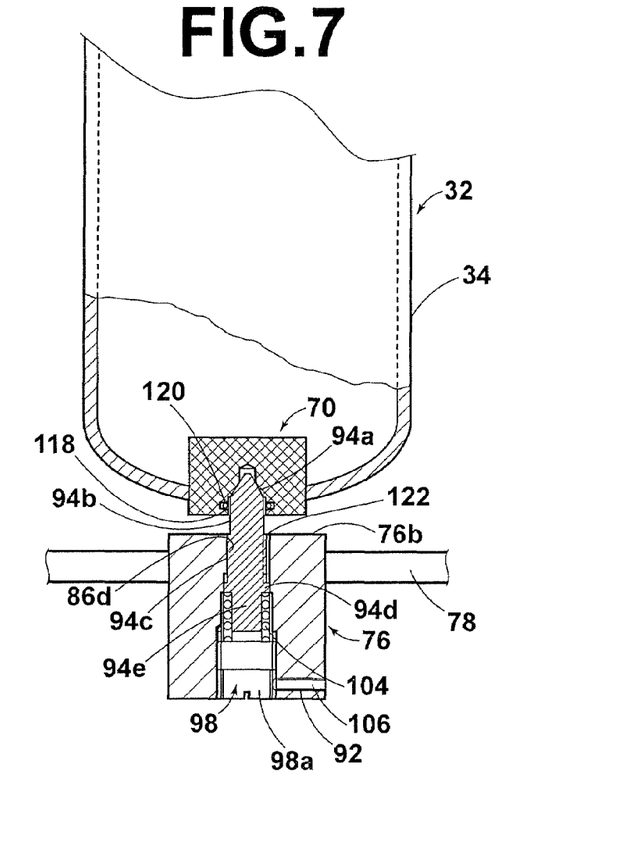
FIG. 7 is a magnified partial sectional view that illustrates the axial support section utilized in the filtration device of the present invention along with a shaft of the screw conveyor.

Next, the core pressing pin 94 (protrusion) and the spring holding member 98, which are to be mounted in the axial support block 76, will be described, with combined reference to FIG. 7. FIG. 7 is a magnified partial sectional view that illustrates the axial support section 60 along with the shaft 34 of the screw conveyor 32. The core pressing pin 94 is a cylindrical member formed of a metal having a lower hardness than stainless steel, such as gun metal. The core pressing pin 94 is constituted by: a substantially conical tip portion 94*a*, a cylindrical upper portion 94*b*, an intermediate portion 94*c* having a greater diameter than the upper portion 94*b*; a discoid flange 94*d*; and a lower portion 94*e* having a smaller diameter than the intermediate portion 94*c*. A keying groove 96 is formed in the intermediate portion 94*c*, along the longitudinal direction of the core pressing pin 94. The keying groove 96 corresponds to the keying groove 90 of the axial support block 76. The spring holding member 98 illustrated in FIG. 6C is a substantially cylindrical member formed of a metal, such as stainless steel. The spring holding member 98 has threads 100 for engaging the threaded section 86*a* of the axial support block 76 at its upper portion, and an engaging groove 102 to be engaged by a tool such as a screwdriver formed in its lower surface.

A state in which the core pressing pin 94 and the spring holding member 98 are mounted in the axial support block 76 will be described with reference to FIG. 7. When the core pressing pin 94 is inserted into the aperture 86 from below, the tip portion 94*a* and the upper portion 94*b* protrude through the upper surface 76*b* of the axial support block 76. At this time, the intermediate portion 94*c* is positioned within the upper aperture 86*d* and the passage aperture 86*c*, while the flange 94*d* and the lower portion 94*e* are positioned within the intermediate aperture 86*b*. The spring holding member 98 presses the core pressing pin 94 from below, via a compression coil spring 104. At this time, the flange 94*d* abuts the step 88 within the aperture 86, to prevent further upward movement of the core pressing pin 94. Therefore, there is no possibility that the core pressing pin 94 will be pressed out of the axial support block 76.

A stop screw 106 is screwed into the threaded aperture 92 to engage therewith, and the tip of the stop screw 106 abuts the lower portion 98*a* of the spring holding member, to prevent rotation thereof. That is, vertical movement of the spring holding member 98 due to rotation thereof is prevented. The keying grooves 90 and 96 are aligned, and a keying member 122 is inserted into the aligned keying grooves 90 and 96, to maintain the aligned state therebetween. That is, the core pressing pin 94 is prevented from rotating within the axial support block 76. The reason why the spring holding member 98 is fixed by the stop screw 106 is as follows. If the core pressing pin 94 rotates, the core pressing pin 94 may cause the spring holding member 98 to rotate. As a result, the spring holding member 98 may fall out from the axial support block 76, or cause the position of the core pressing pin 94 to become lower.

Figure 8:
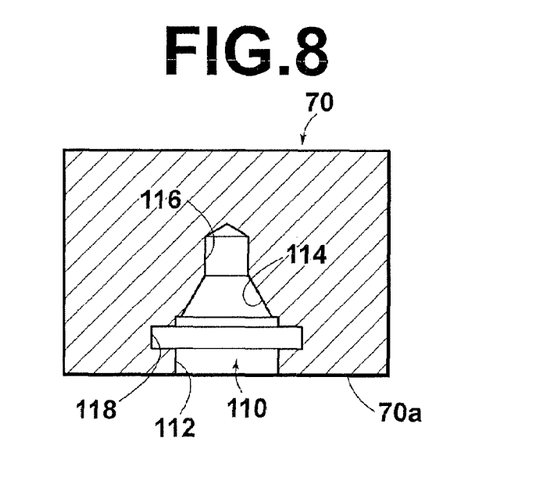
FIG. 8 is a magnified vertical sectional view of a block, which is utilized for the screw conveyor.

Next, the block 70 of the shaft 34 of the screw conveyor 32 that engages with the axial support section 60 will be described in detail with reference to FIG. 8. FIG. 8 is a magnified vertical sectional view of the block 70. The block 70 is a cylindrical member formed of a metal, such as stainless steel. A shaft receiving hole 110 (recess), which is concentric with the axial center of the shaft 34, is formed in the lower surface 70*a* of the block 70. The shaft receiving hole 110 is constituted by: a large diameter portion 112, for receiving the upper portion 94*b* of the core pressing pin 94; a tapered portion 114 that extends upward from the large diameter portion 112 while converging toward the interior; and a recess 116 that extends further inward from the tapered portion 114.

An annular seal receiving groove 118, having a larger diameter than the large diameter portion 112, is formed at an intermediate position in the axial direction of the large diameter portion 112. An annular oil seal 120 (refer to FIG. 7) is provided in the seal receiving groove 118. The tapered portion 114 is tapered at the same angle as that of the taper of the conical tip 94a of the core pressing pin 94. Accordingly, the shaft receiving hole 110 and the core pressing pin 94 are substantially complementary in shape.

When the tip 94a of the core pressing pin 94 and the shaft receiving hole 110 are engaged, the upper portion 94b is sealed by the oil seal 120, to prevent entry of fine activated carbon particles. In addition, the recess 116 functions as an escape for the distal end of the tip 94a. When the block 70 and the core pressing pin 94 are engaged, the core pressing pin 94 is moved slightly downward due to the load applied from above. Accordingly, the flange 94d of the core pressing pin 94 moves downward and separates from the step 88 within the aperture 86, while being urged upward by the spring 104. The distance of separation between the flange 94d and the step 88 is the dimension for which frictional wear can be compensated.

The filtering operation of the filtration device 1 constructed in this manner will be described with reference to FIG. 1. During normal filtration, raw water is supplied to the interior of the filtration tank 2 from the raw water supply pipe 56. The raw water permeates through the activated carbon 14 within the filtration tank 2, and also enters the cleansing tank 38 and permeates through the activated carbon 14 therein. That is, filtration is enabled in the cleansing tank 38 as well.

Filtered water, which has passed through the activated carbon 14 to have chlorine and organic materials adsorbed therefrom, passes through the mesh 50 and permeates through the layer of gravel 54. The filtered water then passes through the filter bed 4 via the strainers 12, is discharged through the filtered water discharge pipe 46 at the lower portion of the filtration tank 2, and is provided for utilization.

Next, a method of cleansing the activated carbon 14, when clogging occurs therein due to a long period of use, will be described. First, filtered water is backwashed through the filtered water discharge pipe 46. Thereby, the filtered water is caused to be ejected into the activated carbon 14 via the layer of gravel 54, thereby causing the activated carbon 14 to float. The load on the motor 26 when initiating driving thereof is reduced, by the activated carbon 14 being caused to float.

Next, the motor 26 is driven to initiate rotation of the screw conveyor 32. The activated carbon 14 is drawn through the openings 40 and 62 and pushed upward into the cleansing tank 38, by the blade 43 of the screw conveyor 32. The rotational speed of the screw conveyor 32 at this time is selected from within a range of 100 to 400 RPM, for example, according to the volume of the filtration tank 2, the diameter of the blade 43, and the like. However, the rotational speed may be outside this range. This cleansing operation is performed once every two or three days, for about a minute at a time. However, it goes without saying that the intervals between cleansing operations and the amount of time thereof may be varied as desired, according to the size of the filtration tank 2, the degree of clogging (reduction in adsorption abilities), and the like.

The backwash of filtered water is continued during the initial stage of rotation of the screw conveyor 32. This is because mixing of the activated carbon 14 at the radially outer and inner portions of the cleansing tank 38 is facilitated by rotating the screw conveyor 32 in the backwash cleansing state, due to centrifugal force of the screw conveyor 32. At the same time, the entirety of the activated carbon 14 is thoroughly cleansed by this movement. Thereafter, the backwash of filtered water is continued at an extremely low speed, by reducing the flow rate to a degree that does not cause contaminants to drop into the strainers 12. The rotation of the screw conveyor 32 is continued, in order to cleanse the activated carbon 14.

The particles of the activated carbon 14 are conveyed upward by the rotation of the screw conveyor 32 while rubbing against and scrubbing each other, and are discharged from the upper openings 42 to the exterior of the cleansing tank 38. Separation of contaminants from the activated carbon 14 is enhanced by the impact of the activated carbon 14 with the surface of the water within the filtration tank 2. The activated carbon 14 which has dropped back into the filtration tank 2 is conveyed upwards into the cleansing tank 38 repeatedly, and scrubbed therein. In this manner, contaminants are separated from the activated carbon 14 by repetitive cleansing within the cleansing tank 38.

When cleansing is complete, filtered water is backwashed again from the filtered water discharge pipe 46 while the screw conveyor 32 is rotating, to perform a rinsing operation. The backwash rinsing operation is continued after the screw conveyor 32 ceases to rotate. The liquid, which is backwashed from the filtered water discharge pipe 46, sprays into the layer of gravel 54 through the slots of the strainers 12 within the filter bed 4. The liquid further passes through the wire mesh 50 and rises into the layer of filtration media 14. At this time, contaminants in the activated carbon 14 and the gravel 54 in the vicinity of the wire mesh 50 are easily removed by the backwash flow of liquid. Contaminants, which are trapped in the strainers 12, are also easily removed through the slots by the backwash flow of liquid. The contaminants which have been separated from the activated carbon 14 floats and is expelled through the raw water supply pipe 56, along with water that contains contaminants.

During the rinsing operation, cleansing water is powerfully sprayed between the two filter beds 50 and 4 of the filtration tank 2 from the cleansing water spraying pipes 58. The sprayed cleansing water form a vortex flow within the layer of gravel 54. Contaminants attached to the gravel 54 are separated therefrom, by exposure to this vortex flow of water. The separated contaminants pass through the wire mesh 50 and are caused to flow upward. The contaminants are prevented from dropping below the filter bed 4, because filtered water from the filtered water discharge pipe 46 is being sprayed through the strainers 12. The cleansing water, which is sprayed from the slots 19, is useful in effectively expelling the contaminants separated from the gravel 54 upward at this time as well. By continuing the backwash rinsing for a necessary amount of time, all of the contaminants are removed from the filtration tank 2.

Filtration and cleansing are performed as described above. During rotation of the screw conveyor 32, axial fluctuation of the shaft 34 does not occur, because of the axial support structure in which the lower end 44 is axially supported. Further, what is important is that the core pressing pin 94 and the block 70 automatically compensate for wear that occurs due to rotation during contact therebetween. The compensating function will be described below.

AS most clearly illustrated in FIG. 7, the weight and the load in the horizontal direction of the screw conveyor 32 is supported by the tip 94a of the core pressing pin 94. A major portion of the weight of the screw conveyor 32 is supported at the upper end thereof, and therefore the downward load exerted thereby is not great. However, the tip 94a of the axial support section 60 and the tapered portion 114 of the block 70 are constantly in contact, and become worn due to the rotation of the screw conveyor 32. Particularly, because the axial support section 60 is surrounded by the activated carbon 14, fine particles of the activated carbon 14 which have passed through the oil seal 120 are present between the tip 94a and the tapered portion 114. No metallic material can avoid frictional wear, due to the presence of the fine carbon particles.

As a result, the tip 94a of the core pressing pin formed by gun metal, which is of a lower hardness than stainless steel, becomes worn by the tapered portion 114 of the stainless steel block 70, thereby shortening the length of the core pressing pin 94. However, the core pressing pin 94 is constantly being urged upward by the spring 104, and therefore the length reduced by wear is compensated for, by the core pressing pin 94 moving upward. Accordingly, looseness does not occur between the core pressing pin 94 and the screw conveyor 32, and a favorable contact state is maintained therebetween for the axial support section 60 to support the shaft 34.

Several millimeters of frictional wear of the core pressing pin 94 can be compensated for. However, it goes without saying that the degree of frictional wear that can be compensated for can be increased or decreased, by varying the length of the core pressing pin 94 or the dimensions of the shaft receiving hole 110. Note that the core pressing pin 94, the compression coil spring 104 that urges the core pressing pin 94, and the spring holding member 98 are collectively referred to as a frictional wear compensating mechanism.

The present invention maintains the performance of the filtration device 1, which has a great vertical length, while minimizing maintenance operations. Therefore, the present invention is particularly suited for filtration tanks that utilize activated carbon. The unit cost of activated carbon is extremely expensive compared to that of gravel, and the adsorption ability thereof diminishes after a certain period of time. Therefore, the activated carbon needs to be replaced more frequently than gravel. As a result, running costs are extremely high, when compared against filtration devices that use sand as filtration media.

The reasons for the need for frequent replacement are as follows. When activated carbon is utilized as filtration media, water paths are formed due to the activated carbon agglomerating in planar form, from the surface to the upper portion of the of the filtration media layer. As a result, filtration is only performed in the vicinities of the water paths, and activated carbon in the middle and lower portions of the filtration media layer still possess adsorption functions. However, because the adsorption performance decreases as a whole, replacement of the filtration media is performed, without effectively utilizing the entire activated carbon layer.

However, by use of the filtration device 1 of the present invention, the life of the activated carbon is extended, and it becomes possible to decrease the replacement frequency, thereby reducing running costs. Particularly, even in the case that the core pressing pin 94 needs to be replaced, the cleansing mechanism 6 comprising the cleansing tank 38 and the screw conveyor 32 can be removed from the filtration tank 2. Therefore, replacement of the core pressing pin 94 is facilitated. In addition, the core pressing pin 94 is molded from a metallic material which is lower in hardness than the block 70. Therefore, the degree of frictional wear will be greater in the core pressing pin 94 than in the block 70. Accordingly, the only part that needs to be replaced is the core pressing pin 94, which is easily replaced. Therefore, replacement of parts is further facilitated.

A preferred embodiment of the present invention has been described above. However, the present invention is not limited to the above embodiment, and various modifications and variations can be considered. For example, a plurality of ultrasonic wave generators may be mounted onto the outer wall of the filtration tank 2 at equidistant intervals. The vibration caused by ultrasonic waves generated by the two or three ultrasonic wave generators would separate contaminants and molecules adsorbed onto the activated carbon 14. Accordingly, the activated carbon 14 can be cleansed more efficiently, and the life thereof can be extended further.

In the embodiment described above, the shaft receiving hole 110 was formed as the recess in the shaft 34 of the screw conveyor, and the core pressing pin 94 was provided as the protrusion on the axial support section 60. Alternatively, the recess and the protrusion may be reversed. That is, a protrusion may be fixed on the lower end 44 of the shaft 44, and a recessed member, which is formed of a material having a comparatively low hardness and which is urged upward by a spring, may be provided in the axial support section 60. In this case, the frictional wear caused by contact between the protrusion and the recess is compensated for, by the recessed member moving upward.

Figure 9:
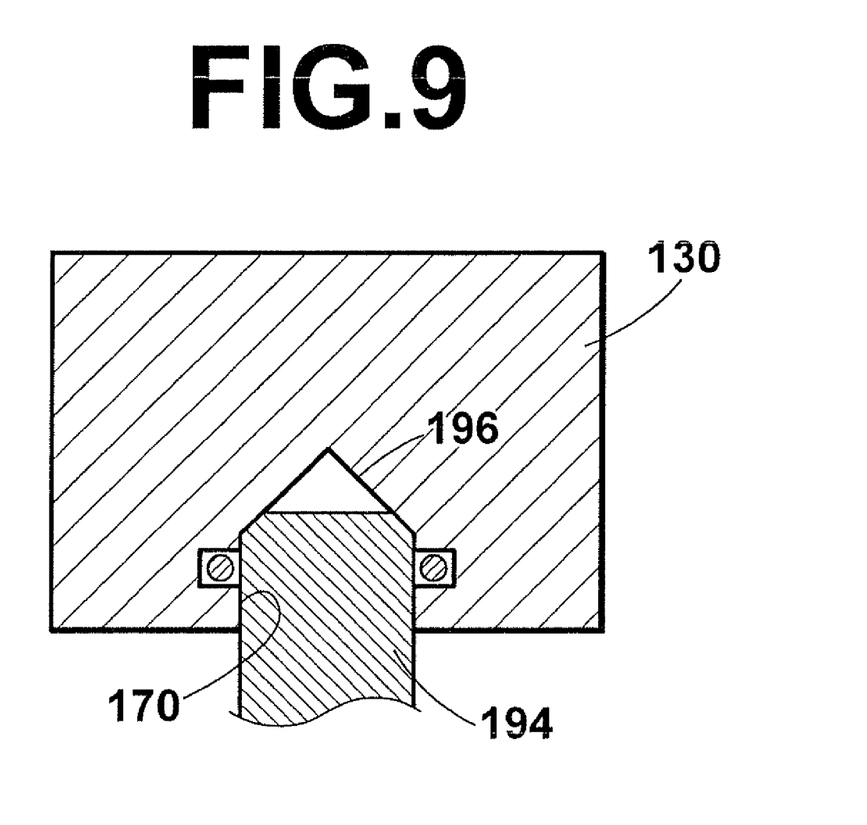
FIG. 9 is a magnified vertical sectional view of an alternate embodiment of a wear compensating mechanism.

A block 130 having a shaft receiving hole 170 as illustrated in FIG. 9 may be utilized as an alternate embodiment of the shaft receiving hole. FIG. 9 is a magnified vertical sectional view of an alternate embodiment of the wear compensating mechanism. The shaft receiving hole 170 does not have the further recess 116. However, a cutout 196 is formed in a core pressing pin 194. Accordingly, the core pressing pin 194 is capable of moving upward to compensate for frictional wear.

In the above embodiment, the cleansing tank 38 is suspended within the filtration tank 2 from above, and the lower end of the cleansing tank 38 is within a hollow space of the filtration tank 2. Alternatively, the lower end of the cleansing tank 38 may be provided directly in the filtration tank 2. The axial support section may also be fixed to the filtration tank 2.

The above embodiment describes a case in which activated carbon 14 is utilized as filtration media. It goes without saying that other filtration media, such as gravel, may be utilized.

The invention claimed is:
1. A filtration device comprising:
a filtration tank, having a filter bed for supporting a layer of particulate filtration media;
a vertically oriented hollow cleansing tank having an opening at the lower end thereof, provided in the filtration tank;
a screw conveyor within the cleansing tank, for conveying the filtration media upwards;
the screw conveyor has a shaft, which is suspended within the filtration tank from above;
the upper portion of the shaft is driven, and the lower portion of the shaft is supported by an axial support section, which is fixed in the opening at the lower end of the cleansing tank; and
a frictional wear compensating mechanism is provided at a portion of the axial support section where the shaft and the axial support section contact each other; and
a contaminant expulsion mechanism, for expelling contaminants separated from the filtration media during cleansing to the exterior of the filtration tank.
2. A filtration device as defined in claim 1, wherein:
a recess is provided in the lower end of the shaft of the screw conveyor;
a protrusion having an upper tip for engaging with the recess is provided on the axial support section; and the frictional wear compensating mechanism is constituted such that the protrusion is constantly urged toward the screw conveyor by a spring.

3. A filtration device as defined in claim 2, wherein:
the upper tip of the protrusion is conical in shape;
the recess is formed to be substantially complementary with the conical shape of the protrusion; and
a cutout is provided in the tip of the protrusion, or a further recess is provided in the center of the recess.

4. A filtration device as defined in claim 3, wherein:
the cleansing tank is suspended within the filtration tank from above.

5. A filtration device as defined in claim 4, wherein the axial support section comprises:
a ring, which is mounted about the periphery of the lower end of the cleansing tank;
a central portion for holding the spring and the protrusion;
and a plurality of link rods for linking the central portion and the ring.

6. A filtration device as defined in claim 5, wherein:
the filtration media is activated carbon.

7. A filtration device as defined in claim 4, wherein:
the filtration media is activated carbon.

8. A filtration device as defined in claim 3, wherein:
the filtration media is activated carbon.

9. A filtration device as defined in claim 2 wherein:
the cleansing tank is suspended within the filtration tank from above.

10. A filtration device as defined in claim 9, wherein the axial support section comprises:
a ring, which is mounted about the periphery of the lower end of the cleansing tank;
a central portion for holding the spring and the protrusion;
and a plurality of link rods for linking the central portion and the ring.

11. A filtration device as defined in claim 10, wherein:
the filtration media is activated carbon.

12. A filtration device as defined in claim 9, wherein:
the filtration media is activated carbon.

13. A filtration device as defined in claim 2, wherein:
the filtration media is activated carbon.

14. A filtration device as defined in claim 1, wherein:
the cleansing tank is suspended within the filtration tank from above.

15. A filtration device as defined in claim 14, wherein the axial support section comprises:
a ring, which is mounted about the periphery of the lower end of the cleansing tank;
a protrusion for supporting the screw conveyor;
a spring for urging the protrusion;
a central portion for holding the spring and the protrusion;
and a plurality of link rods for linking the central portion and the ring.

16. A filtration device as defined in claim 15, wherein:
the filtration media is activated carbon.

17. A filtration device as defined in claim 14, wherein:
the filtration media is activated carbon.

18. A filtration device as defined in claim 1, wherein:
the filtration media is activated carbon.

\* \* \* \* \*